United States Patent [19]

Ewertowski

[11] 4,069,741
[45] Jan. 24, 1978

[54] VERTICAL TOOL HEAD FOR HEADSTOCK OF HORIZONTAL DRILLING-MILLING MACHINES

[75] Inventor: Norbert Ewertowski, Dietzenbach-Steinberg, Germany

[73] Assignee: Werkzeugmaschinenfabrik Oerlikon-Buhrle AG, Zurich, Switzerland

[21] Appl. No.: 735,689

[22] Filed: Oct. 26, 1976

[30] Foreign Application Priority Data

Nov. 13, 1975 Switzerland ................. 14710/75

[51] Int. Cl.² .................. B23C 1/12; B23B 39/16
[52] U.S. Cl. ................................. 90/17; 408/35; 408/237
[58] Field of Search .............. 90/11 A, 17, 19; 408/35, 237, 20; 29/568

[56] References Cited

U.S. PATENT DOCUMENTS

| | | | |
|---|---|---|---|
| 3,443,310 | 5/1969 | Burrougs et al. | 29/568 |
| 3,524,248 | 8/1970 | Durr et al. | 29/568 |
| 3,851,562 | 12/1974 | Tomita et al. | 90/11 A |
| 3,930,301 | 1/1976 | Wagner | 90/11 A X |

FOREIGN PATENT DOCUMENTS 1,001,780   8/1965   United Kingdom ................ 90/17

Primary Examiner—Z. R. Bilinsky

[57] ABSTRACT

A vertical tool head for the headstock of a horizontal drilling-milling machine which is carried by a support means above and displaceable parallel to a horizontal tool spindle and can be clamped in its work position at a headstock projection and drivable by the horizontal tool spindle which is mounted in the headstock projection having a headstock clamping surface. The vertical tool head and the support arm can be selectively positioned, by means of two defined thrust movements of different length and opposite to one another in conjunction with a pivotable movement of the vertical tool head through 180° about an axis arranged above and parallel to the horizontal tool spindle, in a park position and work position. In these positions a tool chuck device located at the end of a vertical tool spindle of the vertical tool head is disposed in front of the support arm. The vertical tool head, in the park position, is located above the headstock projection and has its front face located in a vertical plane containing the headstock clamping surface.

14 Claims, 14 Drawing Figures

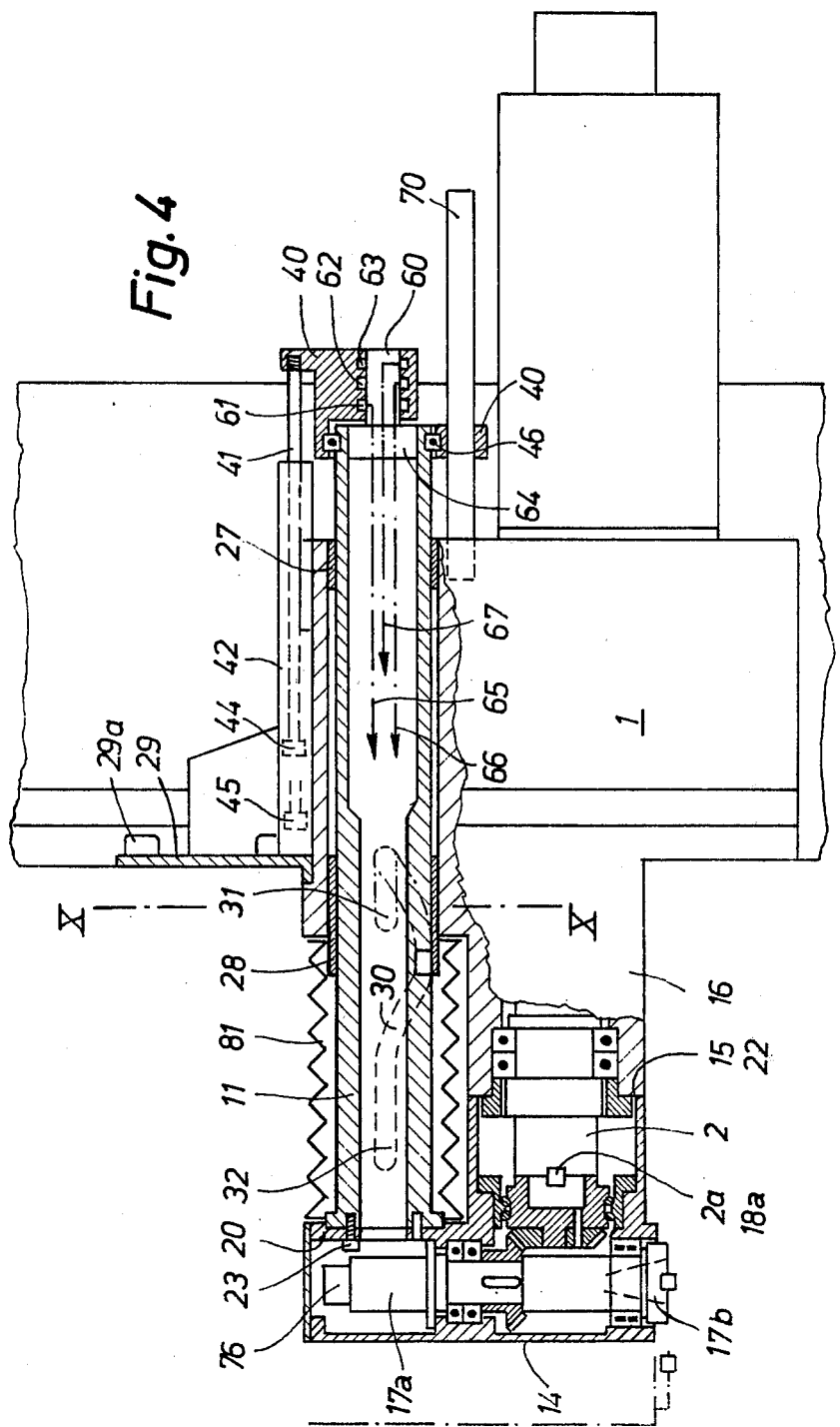

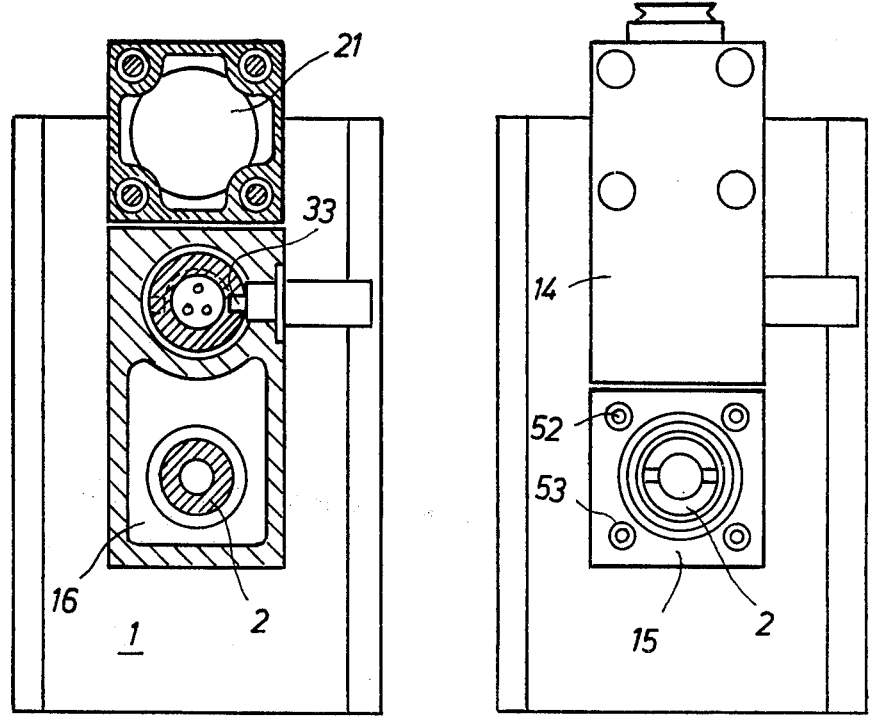
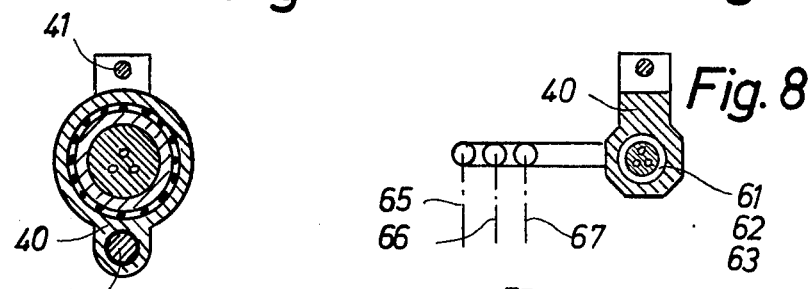
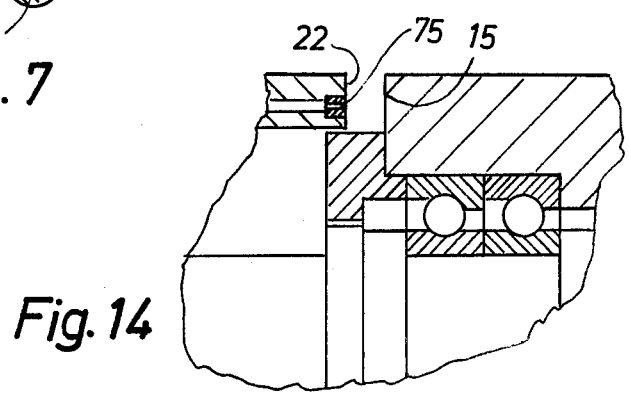

VERTICAL TOOL HEAD FOR HEADSTOCK OF HORIZONTAL DRILLING-MILLING MACHINES

BACKGROUND OF THE INVENTION

The present invention relates to a new and improved construction of a vertical tool head for the headstock of a horizontal drilling-milling machine, which vertical tool head is of the type carried by a support arm disposed above and displaceable substantially parallel to a horizontal tool spindle and can be clamped in a work position at a headstock projection and drivable by the horizontal tool spindle which is mounted at the headstock projection.

There are already known to the art headstocks of larger size horizontal drilling-milling machines equipped with a support arm, at the front end of which there can be mounted, depending upon requirements, different types of tool heads driven by the horizontal tool spindle, in order to make more universal the employment of the machine. When working with the horizontal tool spindle the tool heads are dismantled. The chucking and releasing of the tools at the tool heads is carried out manually. There is not possible any coordinated automatic mode of operation of the horizontal tool spindle and the tool heads, especially when working with a tool changer.

The headstocks of larger plate-drilling-milling devices are sometimes equipped with a lower arm displaceable parallel to the horizontal tool spindle, at the front end of which there is non-detachably mounted an angular milling head which can be rotated through 360°. Its milling spindle is driven by spindle gearing located at the rear end of the lower arm and the lower arm can carry out, by means of a feed drive, milling operations in the direction of the horizontal tool spindle with random angular positions of the angular milling head. Due to the arrangement of the lower arm beneath the headstock the lowest position of the headstock is limited and in the uppermost headstock position the milling spindle does not reach the upper working region of the horizontal tool spindle. The chucking and release of the tools used in the angular milling head only can be manually carried out because of constructional and spatial reasons governed by the work conditions. There is not possible any coordinated automatic mode of operation of the horizontal tool spindle and the milling spindle, especially in conjunction with a tool changer. Due to the special drive required for the milling spindle and owing to the lower arm-feed drive there is a considerably greater structural expenditure, limiting the use of the equipment to large plate drilling-milling devices.

Box-shaped workpieces of small and intermediate size are machined upon a horizontal drilling-milling machine with a workpiece table which can be indexed four times through 90° and with an associated vertical drilling-milling machine. The machining of the four vertical sides of the workpiece, during mass production, is carried out at the horizontal drilling-milling machine equipped with an automatic tool changer and the machining of the horizontal fifth side of the workpiece is carried out at the vertical drilling-milling machine likewise equipped with an automatic tool changer. Depending upon the nature of the degree of automation the chucking of the workpiece from one machine at the other is carried out manually or, if both machines are interlinked into a production line or system, by automatic pallet transports. With a work technique employing two non-interlinked machines there is a greater loss in time due to the manually actuated workpiece transport as well as owing to the required alignment and chucking of the workpiece at each machine. The required investment expenditure consists of:

a. a horizontal machine;
b. a horizontal tool changer with a set of tools;
c. a vertical machine;
d. a vertical tool changer with a set of tools.

In a production system using two interlinked machines and an automatic pallet transport there exists a considerably greater investment expenditure which is only economical in very few manufacturing facilities.

At smaller universal milling machines equipped with a horizontal tool spindle the vertical machining operations are carried out by a vertical tool head pivotably mounted at the machine. The thus employed constructions are not suitable for horizontal drilling-milling machines of the present type under consideration, at which the horizontal tool spindle is mounted in a projection of the vertically displaceable headstock, in order to achieve a free overhang above the workpiece table in conjunction with a tool changer which operates automatically.

SUMMARY OF THE INVENTION

Hence, it is a primary object of the present invention to provide a new and improved construction of a vertical tool head at headstocks of horizontal drilling-milling machines which is not associated with the aforementioned drawbacks and limitations of the prior art constructions.

Another and more specific object of the present invention is to organically integrate at the headstocks of horizontal drilling-milling machines a vertical tool head with a support arm in a simple compact constructional manner, and thus, thereby also provide the prerequisites for a coordinated automatic mode of operation of the horizontal tool spindle and the vertical tool spindle.

Now in order to implement these and still further objects of the invention, which will become more readily apparent as the description proceeds, the invention contemplates that the vertical tool head and the support arm form a unitary structure or rigidly interconnected unit which, by means of two defined thrust movements of different length and directed opposite to one another in functional correlation with a pivotable movement of the vertical tool head through 180° about an axis arranged above and parallel to the horizontal tool spindle, can be shifted into a park position and a work position where a tool chuck device located in conventional manner at the end of the vertical tool spindle is located in front of the support arm. In the park position the vertical tool head which is located above the headstock projection comes to lie with its front face in a vertical plane containing the headstock clamping or chuck surface.

The support arm is preferably constructed as a pivotal-thrust sleeve having a jacket or surface-cam groove cooperating with a cam follower roll which is radially fixed in the headstock and displaceable axially into two positions. The jacket-cam groove opens into two axially parallel lengthwise grooves offset through 180°, wherein the rear lengthwise groove is located at the lengthwise region of the jacket-cam groove and possesses a smaller depth than the jacket-cam groove and the front lengthwise groove.

The vertical tool head possesses at the region of the vertical tool spindle a tool head projection of the same quadratic cross-section as the headstock projection and at each of its corners — protruding from the tool headchuck or clamping surface — there is arranged a respective ball chuck head. These ball chuck heads, when the vertical head assumes the work position, penetrate into coaxial bores of the headstock projection.

At the base of each bore there is concentrically threaded-in a clamping or chuck pin and in the bore and at the clamping pin, respectively, there is guided a closure sleeve which can be displaced into the bore by the associated ball chuck head against the force of a spring.

At the rear end of the pivotal thrust sleeve there is mounted and guided to be non-rotatable a thrust element at which there engages the piston rod of a work cylinder which can be shifted into three positions.

At the rear end of the pivotal thrust sleeve there is furthermore fixedly mounted an infeed plug or pin for compressed air and pressurized oil which cooperates with infeed channels machined in the thrust element.

In order to fix the vertical tool head at the headstock projection there is used one or a number of ball chuck heads and compressed air nozzles are arranged in the tool head-clamping surface, which are briefly acted upon for cleaning purposes by one of the infeed channels directly prior to clamping the vertical tool head.

The bevel gear arranged at the center of the tool head projection for driving the vertical tool spindle is mounted in a large axial-radial roller bearing.

The vertical tool head, according to the invention, affords the following advantages:

a. simpler construction for the automatic setting into the park position and work position, respectively, with only one work cylinder for the thrust- and pivotal movements;

b. good spatial conditions for the automatic tool clamping or chucking device of the vertical tool spindle and the compressed air infeed sleeve or bushing for the cleaning of the tool cone during tool change;

c. compact construction, such that the vertical tool head, both in the park position as well as in the work or machining position, is organically coordinated into the machine and there are present the prerequisites for employing a common tool changer for the horizontal tool spindle and the vertical tool spindle, whereby for automatic five-side machining the vertical machine, the vertical tool changer with its tool set and the workpiece re-chucking are dispensed with; (As a result the stand-still time of the horizontal tool spindle, during the working operation of the vertical tool spindle, for many fields of application need not be longer than the loss in time due to the transport, alignment and chucking of the workpieces at two machines);

d. greater rigidity due to the four-point-ball clamping or chucking at the headstock projection with smaller spacing between the headstock clamping surface and the vertical tool spindle;

e. simple construction of the chuck or clamping device and use of a number of its constructional elements for the fixation of the vertical tool head at the headstock projection.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 4 is a partial longitudinal sectional view, similar to the showing of FIG. 3, with the vertical tool head in the work or machining position;

FIG. 5 is a cross-sectional view taken along the line V — V of FIG. 3;

FIG. 6 is a front view of the headstock;

FIG. 7 is a cross-sectional view taken along the line VII — VII of FIG. 3;

FIG. 8 is a cross-sectional view taken along the line VIII — VIII of FIG. 3;

FIG. 14 is a fragmentary sectional view in the direction of the horizontal tool spindle through the clamping or chucking surfaces with a compressed air nozzle shown on an enlarged scale.

DETAILED DESCRIPTION OF THE PREFERRED EMBODIMENTS

Figure 1:
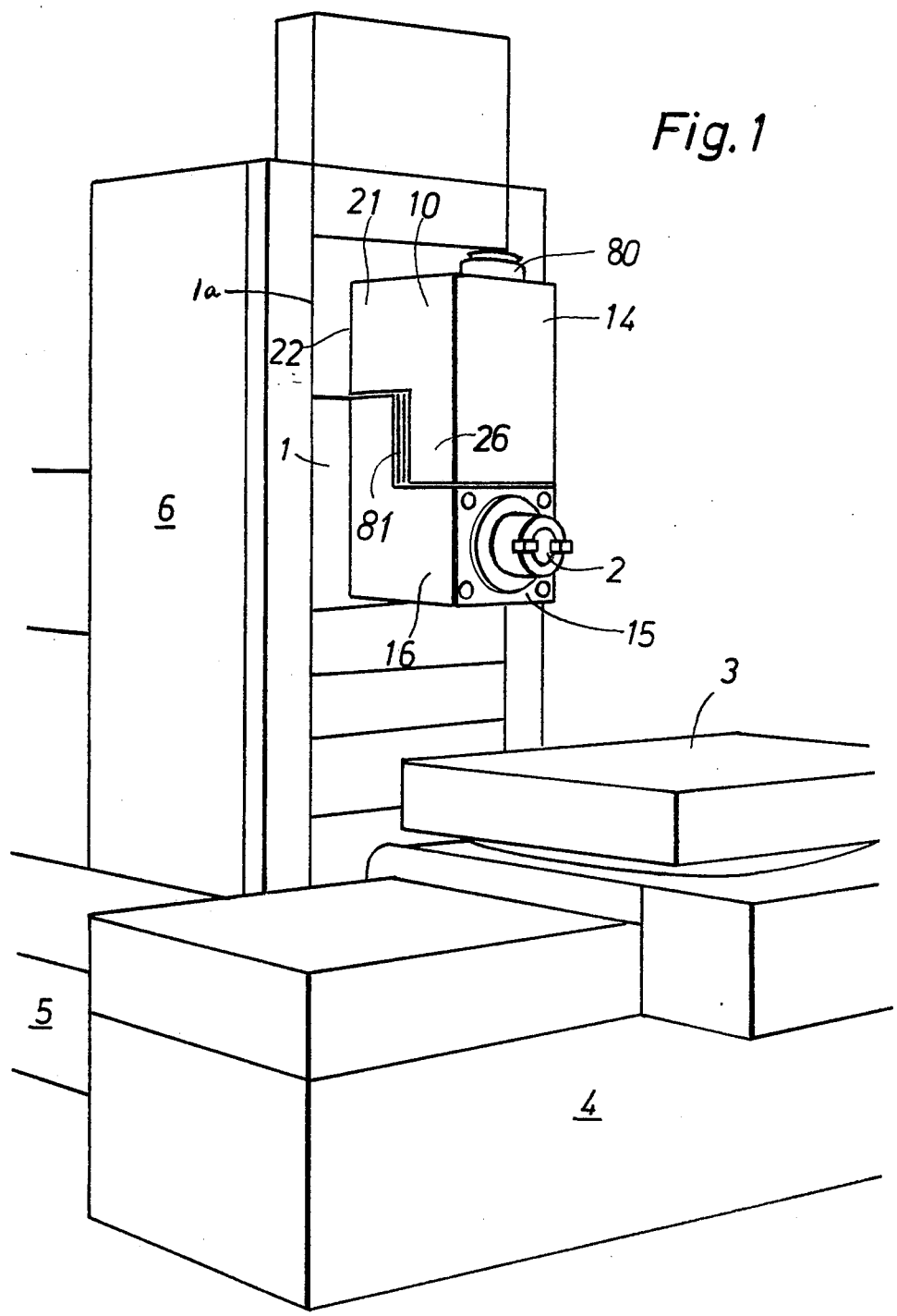
FIG. 1 is a partially perspective front view of a horizontal drilling-milling machine having a vertical tool head shown in the park position.

Describing now the drawings, the illustrated exemplary embodiment of horizontal drilling-milling machine comprises a rotatable workpiece table 3 which is displaceable upon a table bed 4 transversely with respect to a horizontal tool spindle 2. At right angles to the table bed 4 there is guided at the stand bed 5 a machine stand or column 6 in the direction of the horizontal tool spindle 2 which is mounted in a headstock 1. The headstock 1 is vertically displaceable in an opening 1a of the frame-shaped machine stand 6. A headstock projection or overhang 16 of the headstock 1 has a quadratic or square cross-section and a square or quadratic headstock chucking surface 15 for chucking or clamping a vertical tool head 10. Protruding from the headstock chucking or clamping surface 15 is the horizontal tool spindle 2 in order to provide for good accessibility to the workpiece.

Figure 2:
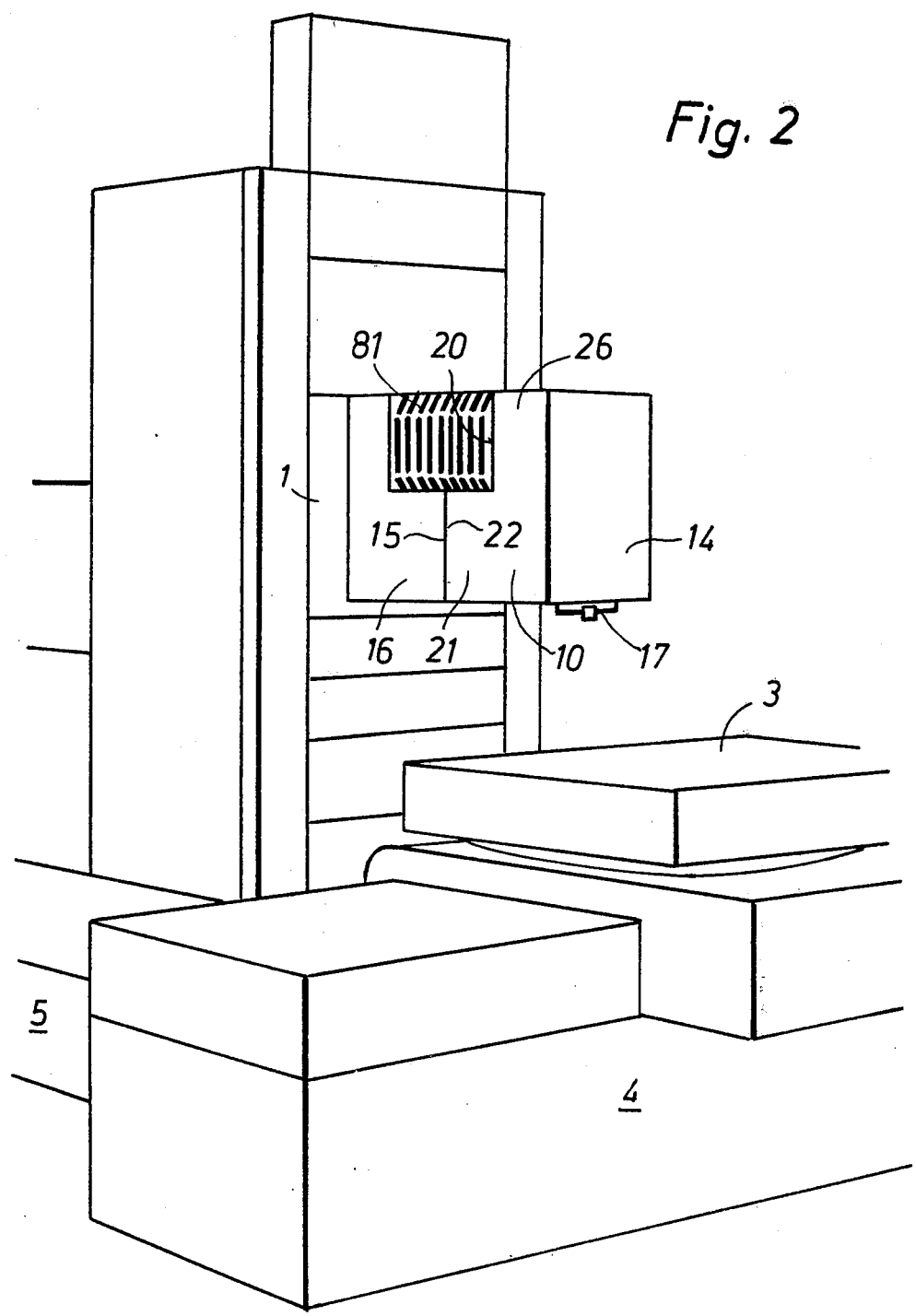
FIG. 2 is a partial front view, similar to the showing of FIG. 1, illustrating the vertical tool head in the work or machining position.

The headstock projection 16 and the vertical tool head 10 essentially have the same outer shape and in the work or machining position of the vertical tool head 10, illustrated in FIGS. 2 and 4, the headstock projection 16 and the tool head projection 21 likewise having a quadratic cross-section flushly contact one another at their clamping or chucking surfaces 15 and 22. In the park position of the vertical tool head 10, illustrated in FIGS. 1 and 3, its front face 14 which is parallel to the tool head clamping or chucking surface 22 is located together with the headstock clamping or chucking surface 15 in a vertical plane and at the tool receiver 17b of the vertical tool spindle 17 there is clamped a protective cap 80 by means of the tool chuck device 17a.

Figure 3:
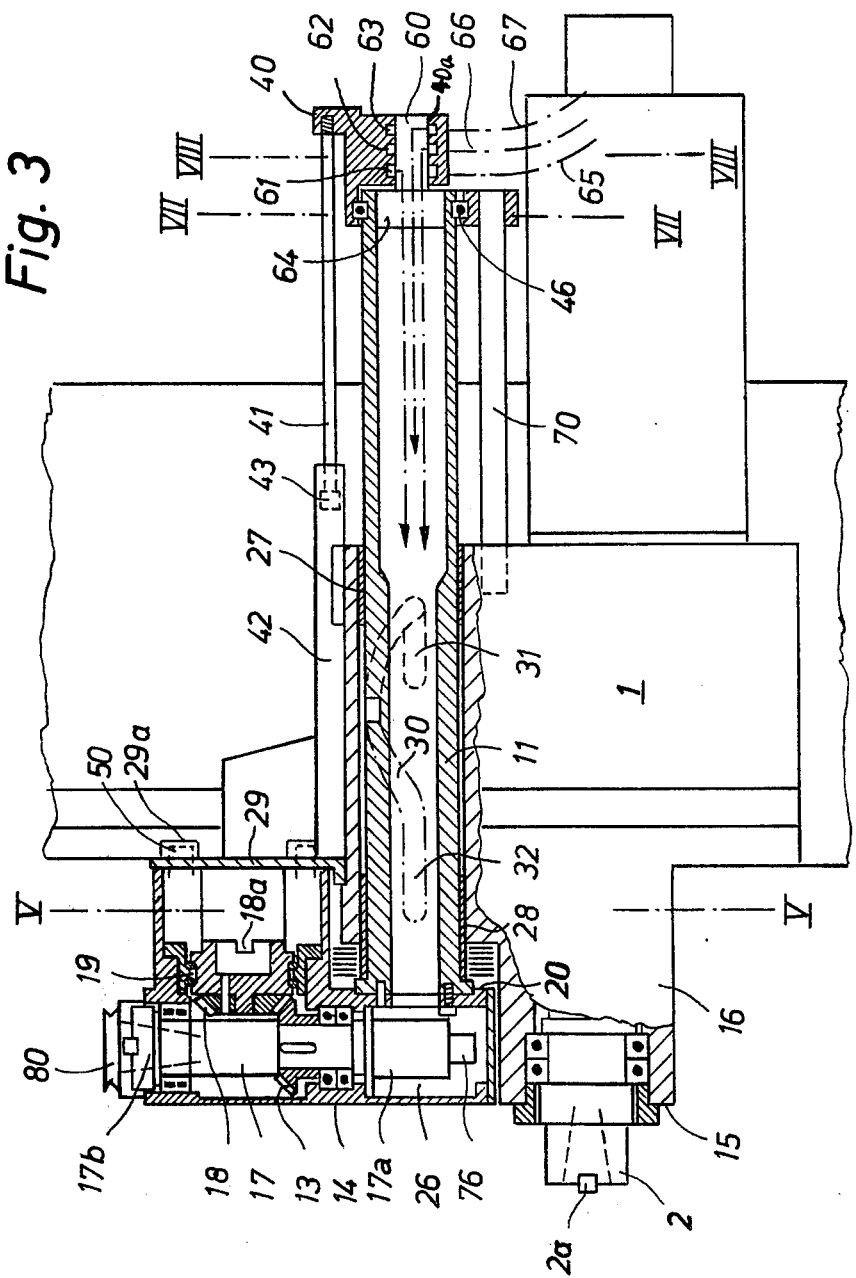
FIG. 3 is a partial longitudinal sectional view of the headstock with the vertical tool head in the park position.

At the region of the tool head projection 21 the vertical tool spindle 17 is snugly mounted behind the front face 14 in such a manner that both in the work or machining position as well as also in the park position it is located in a vertical plane with the horizontal tool spindle 2, and the tool chuck device 17a which, as is conventional is arranged at its end, is located in the offset narrow portion 26. A support arm or support means in the form for instance of pivotal thrust sleeve or bushing 11 serves to transfer the vertical tool head 10 from the park position into the work position, and pivotal thrust sleeve 11 is flanged by means of screws 23 (FIG. 4) or equivalent structure at the rear face 20 of the narrow portion 26 and is pivotably and displaceably mounted at the headstock 1 in the guide bushings or sleeves 27, 28 above the horizontal tool spindle 2. FIG. 3 illustrates that a vertical cover plate 29 is arranged at the headstock 1, at which there comes to bear the tool head-clamping surface 22 in the park position. As a result, when operating with the horizontal tool spindle 2 there are encapsulated in a dustproof manner, apart from the tool head-clamping surface 22, the entrainment grooves 18a of the bevel gear 18 mounted in the tool head projection 21 for the drive of the vertical tool spindle 17 as well as the hereinafter to be described ball clamping or chucking heads 50 protruding from the vertical tool head-clamping surface 22.

The bevel gear 18 is mounted in a large axial-radial roller bearing 19 in order to ensure for a compact headstock projection 16 in conjunction with the protruding horizontal tool spindle 2. This bevel gear 18 engages, on the one hand, with a bevel gear 13 keyed to the vertical tool spindle 17 and, on the other hand, engages with entrainment blocks or dogs 2a of the horizontal tool spindle 2 when the vertical tool head 10 assumes the work or machining position, as shown in FIG. 4.

Transfer from the park position into the work position and vice versa occurs by means of two different length thrust movements of the vertical tool head 10 which are directed opposite to one another, in functional coaction with a pivoting movement through 180°. For the drive there is utilized a thrust piston drive 42 attached to the headstock 1 and having the three piston positions 43, 44, 45, as best seen by referring to FIGS. 3 and 4. In the rear piston position 43 the vertical tool head 10 has assumed the park position, whereas the intermediate piston position 44 corresponds to the work or machining position, and the front piston position 45 serves for the free accessibility or clearance during pivoting-in or moving in front of the horizontal tool spindle 2. In order to actuate the pivotal thrust sleeve 11 there is mounted by means of the roller bearing 46 at its rear end so as to be axially non-displaceable a thrust element 40 at which engages the piston rod 41. A guide rod 70 is attached both below and parallel to the pivotal thrust sleeve 11 at the headstock 1, this guide rod preventing relative rotation of the thrust element 40 and the piston rod 41 with respect to the headstock 1 in all positions.

Figure 9:
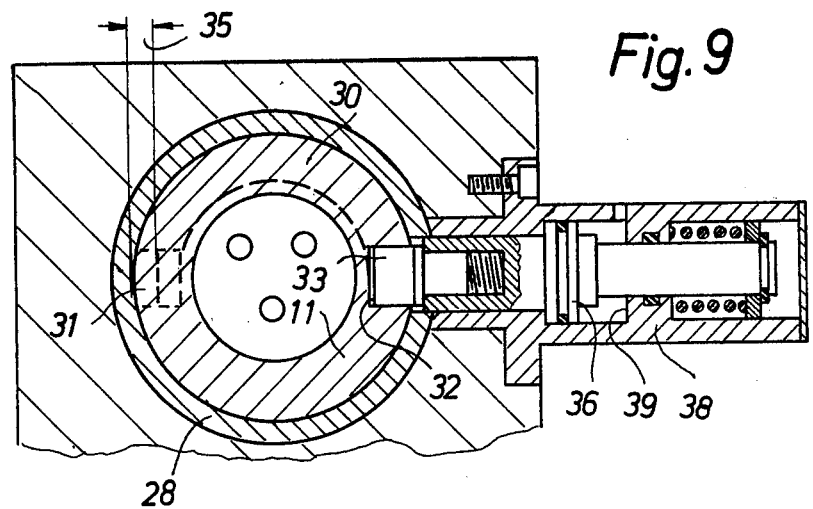
FIG. 9 is a partial sectional view taken along the line V — V of FIG. 3 on an enlarged scale.
Figure 10:
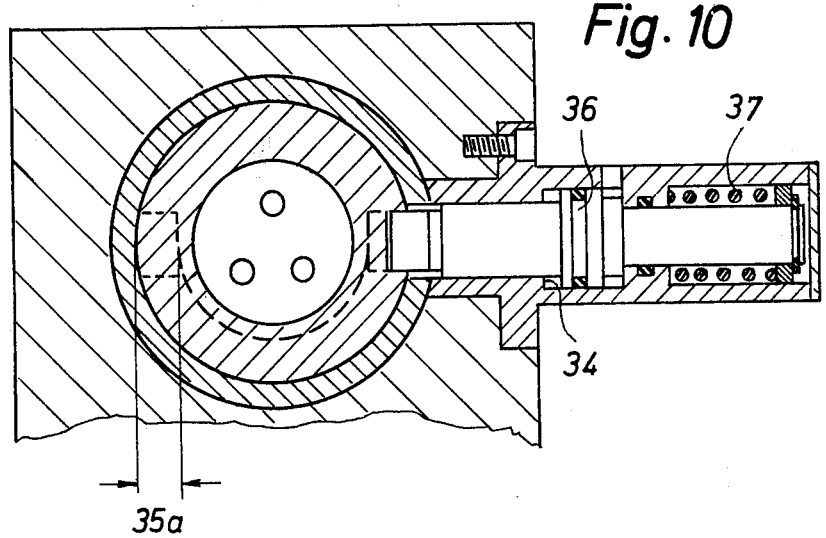
FIG. 10 is a partial cross-sectional view taken along the line X — X of FIG. 4 on an enlarged scale.
Figure 11:
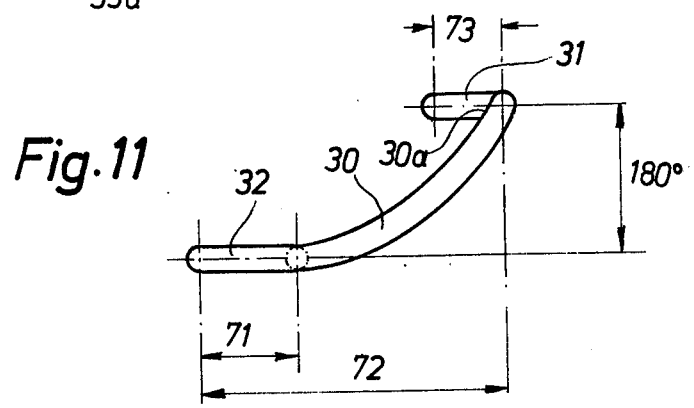
FIG. 11 is a development of the surface cam groove.

During the adjustment movements the vertical tool head 10 is guided by a surface or jacket-cam groove 30 machined in the pivotal-thrust sleeve 11, this cam groove merging at its rear within its lengthwise region with a short axially parallel longitudinal groove 31 and at its front end with a longer axially parallel longitudinal groove 32. The grooves 30, 31 and 32 coact with a cam follower roll or follower 33 which is radially fixed at the headstock however displaceable axially into two positions. Its inner position is assumed, according to the showing of FIG. 9, by impinging the piston 36 in the cylinder flange bushing 38 with pressurized oil and the outer position, according to the showing of FIG. 10, is assumed due to the action of a spring 37 upon impact of the piston 36 at the corresponding stop surfaces 34 and 39 respectively. The rear longitudinal groove 31 possesses a smaller depth than the jacket or surface-cam groove 30 and the front longitudinal groove 32, as illustrated in FIGS. 9, 10 and 11. The different depths of the cam grooves are provided in conjunction with the axial shifting of the cam follower roll 33, in order to be able to realize, in a very simple manner according to the invention, transfer of the vertical tool head 10 from the park position into the work position without any special pivotal drive, as will be explained more fully hereinafter in conjunction with the discussion of the operation.

In the work or machining position the vertical tool head 10 is clamped or chucked by means of four ball clamp heads 50 (see FIG. 12) which are threaded into the four corners of the tool head-clamping surface 22 parallel to the horizontal tool spindle 2, in coaction with a respective pressurized oil impinged plate spring column 55. To this end there are threaded into the headstock projection 16 four clamping or chucking pins 52 at the base of the coaxial bores 51. Since the ball clamping heads 50 protrude from the vertical tool head-clamping surface 22 and in the clamped or chucked condition penetrate into the bores 51, they also serve for the fixation of the vertical tool head 10 at the headstock projection 16. Furthermore, during their penetration a closure sleeve 53 guided at each clamping pin 52 and within the associated bore 51 is shifted against the force of its spring 54 into the associated bore 51. In the park position they close the bores 51 and protect the ball members 56 of the clamping pins 52. The protection of the ball clamping heads 50 occurs by means of the already mentioned cover plate 29 threaded onto the headstock, the pockets 29a of which receive the ball clamping or chucking heads 50. The pivotal thrust sleeve 11 which protrudes i.e. is extended in the work position is protected by the foldable bellows 81.

At the rear bore end of the pivotal thrust sleeve 11 there is attached an infeed pin or plug 60 by means of its projection 64 and this pin is received in the infeed bore 40a of the thrust element 40. Machined at the infeed pin or plug 60 are the bores for three conduits 65, 66, 67 arranged in the hollow pivotal thrust sleeve 11, and which, in order to improve clarity in the illustration of the drawing, have only been shown with broken lines in FIGS. 3 and 4. The pressurized oil conduit or line 65 serves for the actuation of the tool clamping or chuck device 17a, the compressed air conduit 66 leads to the compressed air nozzle 75 (FIG. 14) located in the tool head-clamping surface 22 as well as to the compressed air-infeed sleeve or bushing 76 of the tool clamping device 17a, at which there is also required compressed air for cleaning the tool receiver 17b. The pressurized oil conduit 67 leads to the four cylinders 57 of the previously discussed ball clamping device. The infeed from the outside occurs by means of the three ring-shaped channels 61, 62, 63 machined at the infeed bore 40a of the thrust element 40, as best seen by referring to FIGS. 3, 4 and 8.

Figure 12:
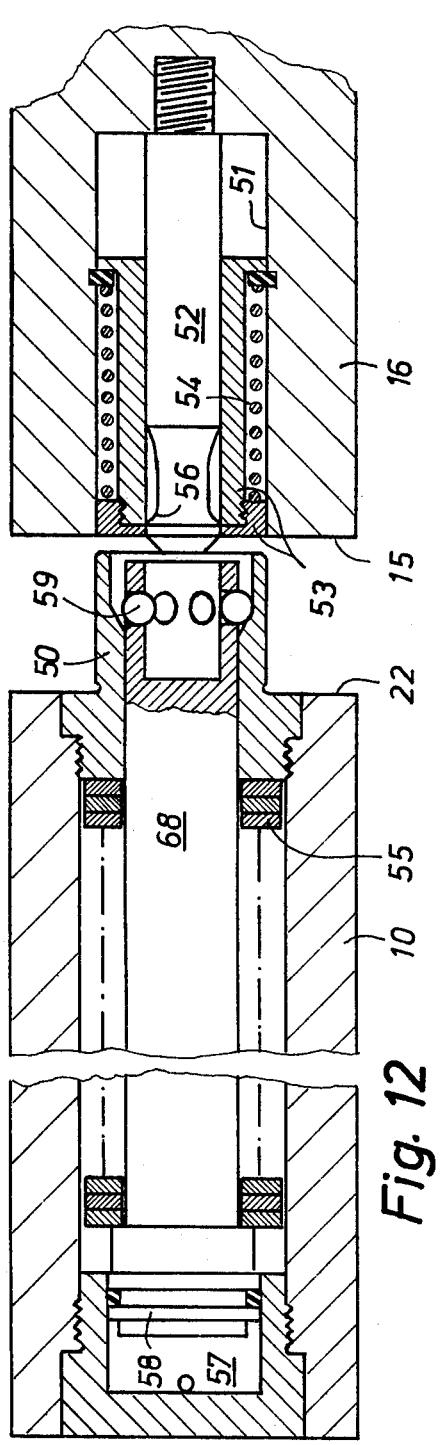
FIG. 12 is a longitudinal sectional view of the clamping or chuck device prior to chucking, shown on an enlarged scale.

Hereinafter there now will be described the mode of operation. Prior to the start of the adjustment from the park position into the work position the pistons 36 and 58 are impinged with pressurized oil so that the inner position of the cam follower roll 33 is secured, as shown in FIG. 9, and by pronounced compression of the plate spring columns 55 the clamping balls or spheres 59 are freed, as shown in FIG. 12. By appropriately impinging the thrust piston drive 42 the outward thrust movement is initiated and, according to FIG. 11, after a linear thrust path 71, which approximately corresponds to the width of the narrow portion 26, the vertical tool head 10 simultaneously begins to rock through 180° until there has been reached the piston position 45 corresponding to the maximum thrust path 72. At this point in time the vertical tool spindle 17 is disposed with the tool receiver 17b located at the bottom, as such has been indicated in FIG. 4 by the phantom line front face 14 of the vertical tool head 10.

Figure 13:
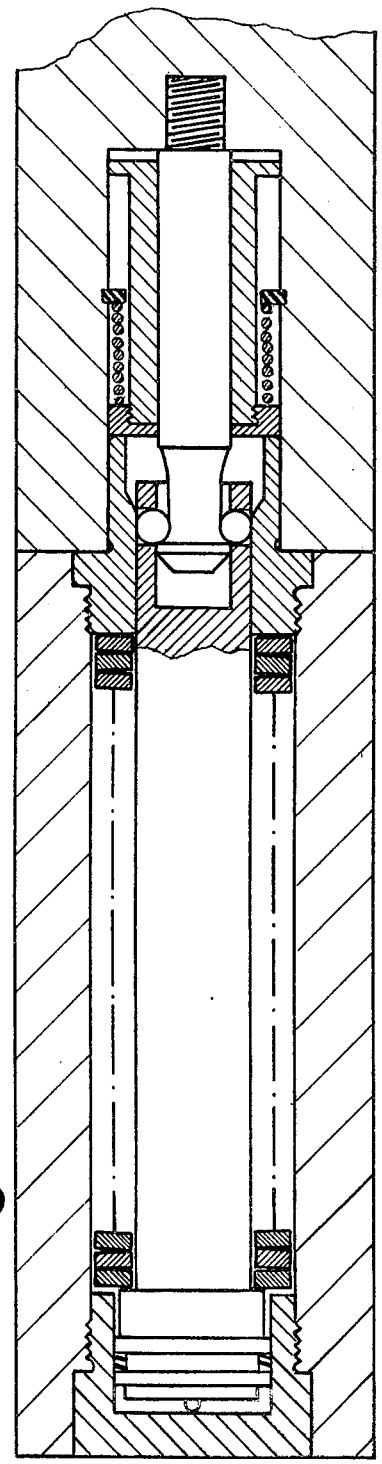
FIG. 13 is a longitudinal sectional view, similar to the showing of FIG. 12, after chucking or clamping has been completed.

Now the piston 36 is switched to oil return flow, by virtue of which the cam follower roll 33 under spring pressure assumes its outer position against the stop surface 39, which corresponds to the depth 35 of the longitudinal groove 31. Thereafter, there occurs the impingement of the thrust piston drive 42 for the piston position 44, whereby the vertical tool head 10 is drawn linearly along the thrust path 73 in the direction of the headstock clamping or chucking surface 15. Before the clamping surfaces 15 and 22 come into contact the compressed air conduit 66 is impinged with compressed air and by means of a number of compressed air nozzles 75 there is carried out cleaning of the headstock clamping or chucking surface 15. After the piston position 45 has been reached, where both of the clamping or chucking surfaces 15 and 22 are located with a small gap from one another, the four cylinders 57 and the thrust piston drive 42 are switched into a pressureless state, as a consequence of which the plate spring columns 55 clamp in conventional manner the vertical tool head 10 at the headstock projection 16 by means of the ball rods 68, the balls or spheres 59, the clamping or chuck pins 52 and the ball clamping heads 50, as shown in FIG. 13. By means of a not particularly illustrated gripper arm of the tool changer the protective cap 80 held by the tool receiver 17b is now engaged and after release by the tool clamping device 17a such protective cap is then removed.

To return the vertical tool head 10 into the park position initially the ball clamping is released by impinging with pressurized oil the cylinder 57. Then the thrust piston drive 42 for the piston position 45 is impinged, with the result that the vertical tool head 10 shifts linearly. After moving through the linear thrust path 73 there is accomplished impingement of the piston 36 with the pressurized oil, so that the cam follower roll 73 penetrates into the larger depth 35a of the surface cam groove 30 in order to be able to initiate, by means of the cam section or portion 30a, the simultaneous pivoting movement during retraction of the vertical tool head, after impingement of the thrust piston drive 42 in the piston position 43. During this initiation of the pivotal movement of the vertical tool head 10 the cam follower roll only penetrates the groove 30 at the short transition cam section 30a at a width which corresponds to the difference between the groove depths 35a and 35. This constructional feature which is present due to the very simple pivotal drive does not have any drawback, because at the start of the pivotal movement the very small prevailing weight movement of the vertical tool head only causes a very small force between the cam follower roll and the short cam section 30a.

While there are shown and described present preferred embodiments of the invention, it is to be distinctly understood that the invention is not limited thereto, but may be otherwise variously embodied and practiced within the scope of the following claims. Accordingly,

What is claimed is:

1. A horizontal drilling-milling machine comprising:
a machine frame;
a headstock displaceably mounted in substantially vertical direction at the machine frame;
said headstock including a headstock projection having a headstock clamping surface for clamping thereat a vertical tool head;
a horizontal tool spindle rotatably mounted in said headstock projection;
a vertical tool head having a front face;
support means for pivotably and displaceably mounting the vertical tool head in a position above and for movement substantially parallel to the horizontal tool spindle;
means cooperating with said support means for displacing said vertical tool head between a park position and a work position;
means for clamping said vertical tool head in said work position at said headstock clamping surface of said headstock projection;
said vertical tool head, when in said work position, being drivable by said horizontal tool spindle mounted in said headstock projection;
said displacing means including means for shifting the vertical tool head during its movement into the park position and into the work position each time through two predetermined different length thrust movements which are directed opposite to one another while performing a pivotal movement of said vertical tool head through an angle of about 180° about an axis disposed above and substantially parallel to the horizontal tool spindle;
said support means fixedly clampingly urging said vertical tool head, when in its work position, against said headstock clamping surface of said headstock projection;
said vertical tool head containing a vertical tool spindle having a tool chucking device located at an end of said vertical tool spindle;
said tool chucking device, in the park and work positions of the vertical tool head, being located in front of the support means;
said vertical tool head when in its park position being disposed above said headstock projection with its front face located substantially in a vertical plane containing said headstock clamping surface.

2. The machine tool as defined in claim 1, wherein said support means comprises a support arm.

3. The machine tool as defined in claim 2, wherein said support arm embodies a pivotal-thrust sleeve having a jacket-cam groove, said shifting means of said displacing means comprising a cam follower roll axially displaceable through two positions in said jacket-cam groove, a pair of substantially axially parallel longitudinal grooves offset through an angle of 180° with respect to one another, said jacket-cam groove merging with said two longitudinal grooves, one of said longitudinal grooves defining a rear longitudinal groove and the other of said longitudinal grooves defining a front longitudinal groove, said rear longitudinal groove possessing a smaller groove depth than the jacket-cam groove and the front longitudinal groove.

4. The machine tool as defined in claim 3, wherein the pivotal-thrust sleeve has a rear end, a rod fixedly secured to the headstock, a thrust element non-rotatably guided at said fixedly secured rod, said thrust element being mounted at the rear end of the pivotal-thrust sleeve, a work cylinder containing a piston having a piston rod movable into three positions, said piston rod being connected with said thrust element.

5. The machine tool as defined in claim 4, further including an infeed plug means for compressed air and pressurized oil fixedly arranged at the rear end of the pivotal-thrust sleeve, infeed channel means provided at the thrust element, said infeed plug means cooperating with said infeed channel means.

6. The machine tool as defined in claim 1, wherein said vertical tool head further comprises a vertical tool head projection arranged at the region of the vertical tool spindle, each said vertical tool head projection and said headstock projection possessing an essentially similar quadratic cross-sectional configuration, said vertical tool head projection including a tool head-clamping surface, said clamping means comprising said vertical tool head projection having corners at said tool head-clamping surface from which protrude a respective ball clamping head, said headstock projection being provided with bores arranged substantially coaxially with respect to said ball clamping heads when said vertical tool head is in its work position, said ball clamping heads penetrating into said coaxial bores of the headstock projection when said vertical tool head is in said work position.

7. The machine tool as defined in claim 6, wherein each bore is provided with a base, a respective clamping pin secured at the base of each bore, a respective closure sleeve guided at each said clamping pin within the associated bore, spring means cooperating with each closure sleeve, said closure sleeve being displaceable into its bore against the force of said spring means when the associated ball clamping head penetrates into such bore.

8. The machine tool as defined in claim 1, wherein said clamping means comprises at least one ball clamping head means for fixing the vertical tool head at the headstock projection.

9. The machine tool as defined in claim 1, wherein said vertical tool head includes a tool head-clamping surface provided with compressed air nozzle means, infeed channel means for compressed air cooperating with said compressed air nozzle means for infeeding compressed air thereto prior to clamping the vertical tool head at the headstock projection.

10. The machine tool as defined in claim 1, further including a bevel gear for driving the vertical tool spindle arranged within the vertical tool head projection, and axial-radial roller bearing means for mounting said bevel gear.

11. The machine tool as defined in claim 1, wherein said vertical tool head and said support means constitute a unitary structure.

12. The machine tool as defined in claim 11, wherein said unitary structure contains means for fixedly interconnecting said vertical tool head and said support means with one another into a unit.

13. The machine tool as defined in claim 1, wherein said vertical tool head and said support means comprise an integral structure.

14. A horizontal drilling-milling machine comprising:
a machine frame;
a headstock displaceably mounted at the machine frame;
said headstock including a headstock projection having a headstock clamping surface for clamping thereat a vertical tool head;
a horizontal tool spindle mounted in said headstock projection;
a vertical tool head having a front face;
support means for pivotably and displaceably mounting the vertical tool head in a position above and for movement relative to the headstock;
means cooperating with said support means for displacing said vertical tool head between a park position and a work position;
means for clamping said vertical tool head in said work position at said headstock clamping surface of said headstock projection;
said displacing means including means for shifting the vertical tool head during its movement into the park position and into the work position each time through plural predetermined different length thrust movements which are directed opposite to one another while performing a pivotal movement of said vertical tool head through an angle of about 180° about an axis disposed above and substantially parallel to the horizontal tool spindle;
said support means fixedly clampingly urging said vertical tool head, when in its work position, against said headstock clamping surface of said headstock projection;
said vertical tool head when in its park position being disposed above said headstock projection with its front face located substantially in a vertical plane containing said headstock clamping surface.

* * * * *